United States Patent
Breme et al.

(10) Patent No.: US 9,529,123 B2
(45) Date of Patent: Dec. 27, 2016

(54) LENS BLANK HAVING A TEMPORARY GRIP COATING FOR A METHOD FOR MANUFACTURING SPECTACLE LENSES ACCORDING TO A PRESCRIPTION

(71) Applicant: Satisloh AG, Baar (CH)

(72) Inventors: Frank Breme, Kappel am Albis (CH); Michael Witzany, Aalen (DE); Marc Peter, Zürich (CH); Guiseppe Viscomi, Senago-Milano (IT); Arturo Colautti, Milan (IT)

(73) Assignee: Satisloh AG, Baar (CH)

( * ) Notice: Subject to any disclaimer, the term of this patent is extended or adjusted under 35 U.S.C. 154(b) by 5 days.

(21) Appl. No.: 14/746,941

(22) Filed: Jun. 23, 2015

(65) Prior Publication Data

US 2016/0003986 A1    Jan. 7, 2016

(30) Foreign Application Priority Data

Jul. 5, 2014 (EP) .................................... 14002302

(51) Int. Cl.
*G02B 1/00* (2006.01)
*G02B 1/18* (2015.01)
(Continued)

(52) U.S. Cl.
CPC ................. *G02B 1/18* (2015.01); *B24B 9/146* (2013.01); *B24B 13/005* (2013.01); *G02B 1/10* (2013.01);
(Continued)

(58) Field of Classification Search
CPC ............. G02B 1/11; G02B 1/115; G02B 1/18; G02B 27/0006; G02B 1/10; G02B 1/105; G02B 1/12; G02B 1/14; G02C 7/022; G02C 7/024; G02C 2202/16; B24B 13/005; B24B 9/14; B24B 9/146
(Continued)

(56) References Cited

U.S. PATENT DOCUMENTS 5,938,381 A    8/1999 Diehl et al.
6,082,298 A    7/2000 Suter
(Continued)

OTHER PUBLICATIONS

An Introduction to the Coating of Ophthalmic Lenses, Satisloh, Baar, Switzerland, Jan. 2006, 36 pages.
(Continued)

*Primary Examiner* — Euncha Cherry
(74) *Attorney, Agent, or Firm* — Reising Ethington, P.C.

(57) ABSTRACT

A lens blank is proposed, having a first face, an opposite, second face, and an edge inbetween, the first face possessing a final curvature and being coated, in this order, with an antireflection coating, a top coating, and a temporary grip coating. The antireflection coating has a stack of alternating antireflection layers with an outermost layer, whereas the top coating is selected from a group including hydrophobic, oleophobic and dirt repelling coatings. The temporary grip coating and the outermost layer of the antireflection coating are made from one and the same coating material. In this way the temporary grip coating effectively serves to provide sufficient adhesion to the blocking material on the block piece in the processing steps, and can easily be removed from the processed lens upon deblocking without degrading the repelling properties of the top coating.

20 Claims, 8 Drawing Sheets

(51) Int. Cl.
*B24B 9/14* (2006.01)
*G02B 1/10* (2015.01)
*G02B 1/11* (2015.01)
*B24B 13/005* (2006.01)
*G02C 7/02* (2006.01)

(52) U.S. Cl.
CPC ............... *G02B 1/11* (2013.01); *G02C 7/022* (2013.01); *G02C 2202/16* (2013.01)

(58) Field of Classification Search
USPC ........................................................ 359/507
See application file for complete search history.

(56) References Cited

U.S. PATENT DOCUMENTS

| | | | |
|---|---|---|---|
| 6,227,952 B1 | 5/2001 | Diehl et al. |
| 6,558,586 B1 | 5/2003 | Padiou et al. |
| 6,712,671 B2 | 3/2004 | Wallendorf et al. |
| 7,066,794 B2 | 6/2006 | Granziera et al. |
| 7,278,908 B2 | 10/2007 | Urban et al. |
| 7,373,706 B2 | 5/2008 | Savoie |
| 7,488,509 B2 | 2/2009 | Lacan et al. |
| 7,597,033 B2 | 10/2009 | Savoie et al. |
| 7,748,341 B2 | 7/2010 | Muster et al. |
| 7,829,198 B2 | 11/2010 | Urabe et al. |
| 7,975,356 B2 | 7/2011 | Schafer et al. |
| 8,082,756 B2 | 12/2011 | Conte et al. |
| 8,153,193 B2 | 4/2012 | Biver et al. |
| 8,252,368 B2 | 8/2012 | Lacan et al. |
| 8,382,932 B2 | 2/2013 | Savoie |
| 8,616,150 B2 | 12/2013 | Savoie et al. |
| 8,628,071 B2 | 1/2014 | Fiedler et al. |
| 8,905,388 B2 | 12/2014 | Breme et al. |
| 8,931,769 B2 | 1/2015 | Pavel |
| 2011/0033615 A1* | 2/2011 | Breme ............... B24B 13/0057 427/164 |
| 2013/0061462 A1 | 3/2013 | Geurts et al. |

OTHER PUBLICATIONS

Handbook of Adhesive Technology, Edited by: A. Pizzi and K.L. Mittal, 2003, Application of Plasma Technology for Improved Adhesion of Materials, Om S. Kolluri, pp. 193-197.

European Search Report, Application No. 14002302.9-1702, Applicant: Satisloh AG, Dated: Jan. 12, 2015, 10 pages.

* cited by examiner

| No. | Lens material | Base curve (dpt.) | Block piece curve (mm) | No. of lenses tested | Controlled every 6 cycles, observations within 82 cycles (during 30 days) | After additional 60 days of storage at 23°C (without further temperature cycles) |
|---|---|---|---|---|---|---|
| 1P | Poly | 2 | R180 * | 4 | one lens showed 2 mm delamination after 24 cycles | no further increase of delamination |
| 2P | Poly | 2 | R500 | 4 | no delamination | no delamination |
| 3P | Poly | 5 | R110 * | 4 | no delamination | one lens showed 2 mm delamination |
| 4P | Poly | 5 | R180 | 4 | no delamination | no delamination |
| 5P | Poly | 8 | R60 * | 4 | no delamination | no delamination |
| 6P | Poly | 8 | R80 | 4 | no delamination | no delamination |
| 1T | Trivex | 2 | R180 * | 4 | no delamination | 3 lenses with 2 to 5 mm delamination |
| 2T | Trivex | 2 | R500 | 4 | one lens showed 2 mm delamination after 74 cycles, minor increase | further minor increase of delamination |
| 3T | Trivex | 5 | R110 * | 4 | no delamination | no delamination |
| 4T | Trivex | 5 | R180 | 4 | no delamination | no delamination |
| 5T | Trivex | 8 | R60 * | 4 | no delamination | no delamination |
| 6T | Trivex | 8 | R80 | 4 | no delamination | no delamination |
| 1H | 1,67 | 2 | R180 * | 4 | two lenses showed 2 mm delamination after 24 resp. 66 cycles | no significant increase of delamination |
| 2H | 1,67 | 2 | R500 | 4 | no delamination | no delamination |
| 3H | 1,67 | 5 | R110 * | 4 | no delamination | 2 lenses with 5 mm delamination |
| 4H | 1,67 | 5 | R180 | 4 | no delamination | no delamination |
| 5H | 1,67 | 8 | R80 * | 4 | no delamination | no delamination |
| 6H | 1,67 | 8 | R110 | 4 | no delamination | 2 lenses with 2 mm delamination |

* typical block piece curve for this lens base curve

Table 1: Test 1: 30 days with repetitive temperature cycles, followed by storage for additional 60 days at room temperature

FIG. 8

| No. | Lens material | Base curve (dpt.) | Block piece curve (mm) | No. of lenses tested | Controlled after 6 temperature cycles (one day) | After 90 days of storage at 23°C (without further temperature cycles) |
|---|---|---|---|---|---|---|
| 1P | Poly | 2 | R180 * | 2 | no delamination | no delamination |
| 2P | Poly | 2 | R500 | 3 | no delamination | no delamination |
| 3P | Poly | 5 | R110 * | 2 | no delamination | no delamination |
| 4P | Poly | 5 | R180 | 3 | no delamination | no delamination |
| 5P | Poly | 8 | R60 * | 2 | no delamination | no delamination |
| 6P | Poly | 8 | R80 | 2 | no delamination | no delamination |
| 1T | Trivex | 2 | R180 * | 3 | no delamination | no delamination |
| 2T | Trivex | 2 | R500 | 3 | no delamination | no delamination |
| 3T | Trivex | 5 | R110 * | 2 | no delamination | no delamination |
| 4T | Trivex | 5 | R180 | 3 | no delamination | no delamination |
| 5T | Trivex | 8 | R60 * | 2 | no delamination | no delamination |
| 6T | Trivex | 8 | R80 | 3 | no delamination | no delamination |
| 1H | 1,67 | 2 | R180* | 2 | two lenses showed 2mm delamination | no significant increase of delamination |
| 2H | 1,67 | 2 | R500 | 3 | no delamination | no delamination |
| 3H | 1,67 | 5 | R110 * | 2 | no delamination | no delamination |
| 4H | 1,67 | 5 | R180 | 3 | no delamination | no delamination |
| 5H | 1,67 | 8 | R80 * | 2 | no delamination | no delamination |
| 6H | 1,67 | 8 | R110 | 2 | no delamination | no delamination |

* typical block piece curve for this lens base curve

Table 2: Test 2: 6 temperature cycles followed by 90 days of storage at room temperature

FIG. 9

| No. | Lens material | Base curve (dpt.) | Block piece curve (mm) | No. of lenses tested | Controlled every 7 days | After 90 days of storage at 23°C (without further temperature cycles) |
|---|---|---|---|---|---|---|
| 1P | Poly | 2 | R180 * | 2 | no delamination | one lens showed 2 mm delamination |
| 2P | Poly | 2 | R500 | 3 | no delamination | no delamination |
| 3P | Poly | 5 | R110 * | 2 | no delamination | one lens showed 2 mm delamination |
| 4P | Poly | 5 | R180 | 3 | no delamination | no delamination |
| 5P | Poly | 8 | R60 * | 2 | no delamination | no delamination |
| 6P | Poly | 8 | R80 | 2 | no delamination | no delamination |
| 1T | Trivex | 2 | R180 * | 2 | no delamination | no delamination |
| 2T | Trivex | 2 | R500 | 2 | no delamination | no delamination |
| 3T | Trivex | 5 | R110 * | 2 | no delamination | one lens showed 2 mm delamination |
| 4T | Trivex | 5 | R180 | 3 | no delamination | no delamination |
| 5T | Trivex | 8 | R60 * | 2 | no delamination | no delamination |
| 6T | Trivex | 8 | R80 | 3 | one lens showed 2 mm delamination after 63 days | no significant increase of delamination |
| 1H | 1,67 | 2 | R180 * | 2 | no delamination | no delamination |
| 2H | 1,67 | 2 | R500 | 4 | no delamination | no delamination |
| 3H | 1,67 | 5 | R110 * | 2 | no delamination | one lens showed 2 mm delamination |
| 4H | 1,67 | 5 | R180 | 4 | no delamination | no delamination |
| 5H | 1,67 | 8 | R80 * | 2 | no delamination | no delamination |
| 6H | 1,67 | 8 | R110 | 3 | no delamination | no delamination |

* typical block piece curve for this lens base curve

Table 3: Test 3: 90 days of storage at room temperature

FIG. 10

LENS BLANK HAVING A TEMPORARY GRIP COATING FOR A METHOD FOR MANUFACTURING SPECTACLE LENSES ACCORDING TO A PRESCRIPTION

TECHNICAL FIELD OF THE INVENTION

The present invention generally relates to the problem of sufficiently bonding ("blocking") an ophthalmic lens blank to a lens support block ("block piece") for supporting the lens blank during a lens generating process, as applied in prescription workshops in masses, that is to say production workshops for manufacturing individual spectacle lenses from customary materials (mineral glass, polycarbonate, PMMA, CR 39, HI index, etc.) according to a prescription.

More particularly the present invention relates to a lens blank that has a fully finished first face including in particular a hydrophobic, oleophobic and/or dirt repelling top coating, a combination of such lens blank and a block piece for holding the lens blank with the aid of a blocking material for processing thereof, a method of blocking such lens blank onto the block piece with the aid of the blocking material for holding the lens blank for processing thereof, the use of such lens blank in a method for manufacturing spectacle lenses according to a prescription, as well as a method for manufacturing spectacle lenses according to a prescription employing the combination of lens blank and block piece, wherein the lens blank in each case is being provided with a temporary grip coating on top of the top coating, serving to achieve sufficient adhesion at the interface between the lens blank and the blocking material on the block piece.

BACKGROUND OF THE INVENTION AND PRIOR ART

An ophthalmic lens blank generally has a first face with a pre-determined curvature and a second face, opposite the first face on which a desired surface contour is generated by a machining process. The overall process is generally referred to as "lens surfacing" and the overall object is to yield a finished spectacle lens L (shown in section in FIG. 6) so that the curvature of the first (in this instance convex) face cx and the curvature of the machined second (in this instance concave) face cc cooperate to yield desired optical properties according to the prescription. In addition to this the first and/or second faces cx, cc of the lens L are usually coated, cf. FIG. 7 illustrating in an enlarged view of detail VII in FIG. 6 an example for such coating, to provide the finished spectacle lens L with an enhanced ability to resist scratching (by use of a "hard coating" HC), with a low residual reflection and/or a desired color (by use of an "antireflection coating" AR), and/or with certain surface properties such as hydrophobic, oleophobic and/or dirt repelling properties (by use of a "top coating" TC). Usually also a further machining process takes place (the so-called "edging"), the aim of which is to finish-machine the edge E of the spectacle lens L in such a way that the spectacle lens L may be inserted into a spectacle frame. In all these process steps the spectacle lens (blank) L must reliably be held in the machining machine(s) and coating apparatus, respectively.

To this end, U.S. Pat. No. 8,905,388 B2 of the present applicant discloses a special block piece for holding the spectacle lens (blank) throughout the above mentioned processing steps. To be more precise, prior to the processing the lens blank with its first face cx is "blocked" with the aid of a blocking material, for instance a UV or visible light (VIS) radiation curable adhesive composition, on a workpiece mounting face of this block piece, where it remains throughout the processing of in particular the second face cc, including surfacing and thin film coating under vacuum conditions on one and the same block piece, until the processed spectacle lens L is "deblocked" again from the block piece. So as to further minimize the production efforts in the prescription workshop it has further been proposed in this prior art to fully finish the first, blocking face cx of the lens blank prior to the blocking step, including hard coating HC, antireflection coating AR and, if applicable, top coating TC.

The hydrophobic and/or oil-repellent anti-stain top coatings TC, however, most often consist of fluorosilane-type materials that reduce the surface energy so as to prevent the adhesion of greasy stains which are thereby easier to remove. One of the problems associated with such top coating TC is that it may achieve such an efficiency that the adhesion at the interface between the blocking material and the first, blocking face cx of the lens blank is thereby altered. As a result there is a risk that the adhesive connection between the lens blank and the block piece cannot sufficiently withstand the forces that are exerted on the lens blank during the machining thereof. At the worst, the lens blank comes off the block piece and is ruined.

In order to address such problem, it has been proposed already to coat onto a lens blank having an outer hydrophobic and/or oil-repellent surface coating a temporary protective layer comprised of a metallic fluoride, in particular $MgF_2$, and imparting to the lens blank a surface energy at least equal to 15 $mJ/m^2$ so as to achieve sufficient adhesion at the interface between a holding pad and the lens blank for holding pads conventionally used in the technical field to hold the lens blank on a block piece during the edging step. Examples of this method are disclosed in U.S. Publication 2003/0049370 A1 and U.S. Publication 2006/0246278 A1.

This known $MgF_2$ "grip system" functions well as long as it is used for traditional processes in which the blocking and edging steps take place just after the coating steps. However, as a solution for a continuous on-block manufacturing process as disclosed in U.S. Pat. No. 8,905,388 B2 it works in a very limited way only, mainly because of losing surface energy performance by time, as tests have shown.

In the latter process, surface energies of 35 $mJ/m^2$ or higher are necessary in order to provide sufficient adhesion for the surfacing steps. In addition to this, blocking of the cx coated blanks usually takes place only after a certain storage time which may amount up to several weeks in the longest case.

As an example, in the conducted tests a temporary protective layer comprised of $MgF_2$ and having a thickness of 15 nm showed a surface energy of 39 $mJ/m^2$ after a period of one day from coating, but 19 $mJ/m^2$ only at the end of one month after coating. A similar temporary protective layer with a thickness of 90 nm had a surface energy of 62 $mJ/m^2$ one day after coating, and of 35 $mJ/m^2$ after expiry of one month. So the 15 nm layer cannot be used as "grip measure" in the continuous on-block manufacturing process at issue since its surface energy is too low after storage. From the surface energy point of view, the 90 nm layer could only just be used in the process at issue. However, especially in case of thermoelastic substrate materials such as CR 39, the stress to the antireflection coating on the first blocking face of the lens blank would be rather high during the surfacing steps because of the thickness of the 90 nm layer, possibly causing damage to the antireflection coating.

What is desired starting from the generic prior art according to U.S. Publication 2003/0049370 A1 is to provide a lens blank which already has a fully finished first face including in particular a hydrophobic, oleophobic and/or dirt repelling top coating covered by a temporary grip coating, that overcomes the drawbacks previously mentioned and enables in particular spectacle lenses with high optical qualities to be produced in a continuous on-block manufacturing process as disclosed in U.S. Pat. No. 8,905,388 B2, without the risk that the lens blank unintentionally comes off the block piece during the processing steps. The object of the invention further encompasses the provision of a combination of a suited lens blank and a block piece for holding it, of a method of blocking such lens blank, the use of the latter in a method for manufacturing spectacle lenses according to a prescription, and of such method.

SUMMARY OF THE INVENTION

According to a first aspect of the present invention, there is provided a lens blank comprising a first face, a second face opposite the first face, and an edge between the first face and the second face, the first face possessing a final curvature and being coated at least with an antireflection coating, a top coating on top of the antireflection coating, and a temporary grip coating on top of the top coating, the antireflection coating having a stack of alternating antireflection layers of high index and low index with an outermost layer, and the top coating being selected from a group including hydrophobic, oleophobic and dirt repelling coatings; wherein the temporary grip coating and the outermost layer of the antireflection coating are made of one and the same coating material.

As process experiments carried out by the present inventors have shown, a temporary grip coating on top of the top coating, which grip coating is made of the same material as the outermost layer of the antireflection coating carrying the top coating, effectively serves to provide sufficient adhesion to the blocking material on the block piece in the processing steps, in particular the surfacing steps of the continuous on-block manufacturing process as disclosed in U.S. Pat. No. 8,905,388 B2, even after a face coated lens blank storage time of days to weeks before blocking, thereby strongly reducing the risk that the blocked lens blank comes off the block piece during the processing steps. Further, such temporary grip coating surprisingly does not, at least not essentially alter the hydrophobic, oleophobic and/or dirt repelling properties of the face top coating of the processed lens, but remains for the most part on the blocking material upon deblocking the processed lens from the block piece. Any residuals of the temporary grip coating on the face top coating can easily be wiped away by, e.g., manual wiping with a clean cloth and isopropyl alcohol. Further advantages regarding processing times and effort involved result from the facts that one and the same coating material is being used in a similar process and one and the same coating apparatus for applying both layers of the antireflection coating and the temporary grip coating on the first face of the lens blank.

Preferably, the temporary grip coating and the outermost layer of the antireflection coating are made from a metal oxide. $SiO_2$ as the metal oxide is particularly preferred.

The thickness of the temporary grip coating should be chosen such that it is at least thick enough to sufficiently cover the underlying top coating and to provide satisfactory adhesion in terms of surface energy on the one hand. On the other hand greater thicknesses, amongst others, give rise to longer processing times and higher consumable costs. Accordingly, the temporary grip coating may have a thickness ranging from 1 to 500 nm, preferably from 5 to 100 nm, and more preferably from 15 to 25 nm. The latter range being particularly preferred for thermoelastic substrate materials such as CR 39 to reduce stress to the antireflection coating on the first face during the surfacing process.

According to a second aspect of the present invention, there is provided a combination of the above described lens blank and a block piece for holding the lens blank for processing thereof. The block piece has a basic body with a workpiece mounting face against which the lens blank is blocked by use of a blocking material, and a clamping portion via which the lens blank blocked on the basic body can be fixed in a machine or apparatus for processing of the lens blank, wherein the blocking material is applied directly onto the temporary grip coating of the lens blank. Advantageously any protective foil or the like as is usual in the field of manufacturing spectacle lenses to cover and protect the lens blank, the related equipment and process effort, including the steps of applying and removing the protective foil, are dispensable. In other words the temporary grip coating in the combination of lens blank and block piece fully takes over and fulfills the function of the customary protective foil.

Although thermoplastic or pressure sensitive adhesives or adhesive foils are conceivable on principle as the blocking material, the blocking material preferably includes an adhesive curable by UV or visible light that is liquid in an un-polymerized state. Such blocking material not only is ready for use immediately and easy to process, but also offers the advantage that the application of heat or force, that may cause stresses or strains in the lens blank, is not necessary in order to bring about the adhesive effect.

It is further preferred that the basic body of the block piece is made from of a plastic material. Such material is cheap, can be machined without problem if required, and has a relatively low weight which is of advantage in the machining steps in particular.

In accordance with another aspect of the invention, the workpiece mounting face of the block piece may be plasma treated prior to applying the blocking material onto the workpiece mounting face. As process experiments carried out by the present inventors have shown, this optional measure is effective to further enhance the bond between lens blank and block piece, to be more precise between the blocking material and the workpiece mounting face of the block piece, in particular in cases where the curvature of the first face of the lens blank deviates more strongly from the curvature of the workpiece mounting face of the block piece so that the thickness of the blocking material inbetween varies to a greater extent as a function of the radius with respect to a central axis of the block piece.

To this end, according to a third aspect of the present invention, a method of blocking the above described lens blank onto a block piece for holding the lens blank for processing thereof, includes the steps of: (a) providing the block piece which has a basic body with a workpiece mounting face on a first side and a clamping portion on a second side, opposite said first side; (b) plasma treating the workpiece mounting face of the block piece; (c) applying a blocking material between the workpiece mounting face of the block piece and the first face of the lens blank, with the blocking material directly contacting both the plasma treated workpiece mounting face of the block piece and the temporary grip coating on the first face of the lens blank; and (d) causing an adhesive bond between the lens blank and the block piece by applying a pressing force, curing and/or hardening the blocking material depending on the nature thereof, to obtain a combination of the lens blank and the block piece which can be handled in one piece.

Further tests conducted by the present inventors have shown that, for best bonding results, the above step (c) of applying the blocking material between the workpiece mounting face of the block piece and the first face of the lens blank should be carried out within two hours after the above step (b) of plasma treating the workpiece mounting face of the block piece. This measure effectively minimizes the risk that the plasma activated block piece surface as a result of reacting with oxygen ($O_2$) and/or atmospheric humidity becomes saturated, thereby losing adhesive power.

The above described lens blank is particularly intended and suitable for use in a method for manufacturing spectacle lenses according to a prescription, in which method, according to a fourth aspect of the present invention, blocking the lens blank, with the aid of a blocking material, onto a block piece for holding the lens blank for processing thereof takes place at a blocking time in a blocking place, whereas processing the blocked lens blank to obtain the spectacle lens according to the prescription takes place at a processing time in a processing place, wherein the blocking place is different from the processing place and/or there is a time lag of at least one day between the blocking time and the processing time.

The typical case would be a "ship-on-block" approach here, in which a standardized blocking of the lens blanks, that are fully finished at the first face, onto block pieces occurs at a centralized blocking site on an industrial scale, whereupon the blocked lens blanks are shipped to various remote prescription workshops for manufacturing individual spectacle lenses according to the prescription, wherein the shipment plus any storage times before shipping and/or processing may take a considerable time, namely days to weeks. In this case the block pieces advantageously serve as a protection of the blocked lens blanks during the transport and storage thereof, also simplifying the packaging of the lens blanks. Blocking steps at the prescription workshops are thereby eliminated, not only saving time in the prescription workshops but also minimizing the risk of rejects due to individual blocking failures.

Moreover, according to another aspect of the present invention, a method for manufacturing spectacle lenses according to a prescription includes the steps of: (i) providing the above described combination of the lens blank and the block piece; (ii) processing the blocked lens blank on the second face and optionally the edge to obtain a processed lens, wherein said processing step (ii) may also include thin film coating under vacuum conditions on one and the same block piece; and (iii) deblocking the processed lens from the block piece.

Since in this case the spectacle lens blank remains on the block piece throughout the whole face processing step (ii), the processing step can be carried out faster and more efficient with less handling effort as compared to the conventional approach in which the lens blank needs to be deblocked (before coating the second face) and blocked again (before edging) in the processing stage. This reduces the manufacturing costs and even allows for more automation in the prescription workshops. In addition, this approach serves to ensure the production of spectacle lenses with high optical qualities because one and the same geometrical relation between lens blank and block piece is maintained throughout the whole processing stage, thus any errors that are consequential on the conventional re-blocking approach, where the orientation of the lens blank relative to the assigned different block pieces may unintentionally change upon re-blocking, are avoided. Furthermore, as the lens blank is always held on the block piece as standardized interface and handling device during the processing stage the risk that any operator unintentionally touches the lens blank, thereby possibly causing problems in a coating substep, is reduced. A still further advantage lies in the fact here that all production information can be kept on the block piece, for instance by use of a "transponder" integrated in or fixed to the block piece, which offers full tracking possibility throughout the whole process.

According to a further aspect of the invention, the above processing step (ii) may include the following substeps: machining of the blocked lens blank to give the second face a macrogeometry according to the prescription; fine machining of the blocked lens blank to give the second face a required microgeometry; cleaning the blocked lens blank that has been machined and fine machined; if required, spin or dip coating of the blocked lens blank in order to provide the second face with a hard coating, or a primer, or a primer and a hard coating; vacuum coating of the blocked lens blank to provide an antireflection coating and, if desired, a top coating such as hydrophobic and/or oleophobic and/or dirt repelling coating on the second face as well; and, again if required, edging of the blocked lens blank to give the edge a geometry necessary so that the processed lens is ready for insertion into a spectacle frame or a spectacle holder. Since in this approach there is no deblocking step in the processing stage any more, some processing substeps could even be carried out in a different sequence (as compared to the conventional time sequence) where a certain fixed sequence is not necessary from a product point of view. In particular, all machining operations including edging could be carried out prior to the face coating process(es) if desired or required.

Finally, it is preferred that the deblocking step (iii) is carried out using a high-pressure jet of a pressure medium, for example water, which is directed onto an edge region between the processed lens and the block piece in order to separate the processed lens from the block piece. Although a mechanical deblocking by, e.g., pushing the block piece against a solid surface or deforming the basic body of the block piece is feasible as well, high-pressure jet deblocking offers the advantage that the risk of damage to the processed lens upon deblocking is minimized, in particular in case of thin edged lenses. In addition to this, as experiments carried out by the present inventors have shown, with high-pressure jet deblocking the temporary grip coating mostly completely separates from the top coating on the first face of the processed lens and remains on the blocking material, i.e. the blocking adhesive, which still sticks on the block piece or separates therefrom as well under influence of the high-pressure jet of pressure medium, so that manual dry wiping or wiping of the processed lens with a clean cloth and isopropyl alcohol generally suffices as a final cleaning step.

Further effects and advantages of the proposed measures will become apparent to the skilled person from the following description of a currently preferred example of embodiment of the invention.

BRIEF DESCRIPTION OF THE DRAWINGS

Hereinbelow, the invention will be explained in more detail on the basis of a preferred example of embodiment and with reference to the appended, schematic drawings. In the drawings:

FIG. 8 is a view of a table: namely, TABLE 1 for TEST 1: 30 days with repetitive temperature cycles, followed by storage for additional 60 days at room temperature.

FIG. 9 is a view of a table: namely, TABLE 2 for TEST 2: 6 temperature cycles followed by 90 days of storage at room temperature.

FIG. 10 is a view of a table: namely, TABLE 3 for TEST 3: 90 days of storage at room temperature.

DETAILED DESCRIPTION OF A PREFERRED EMBODIMENT OF THE INVENTION

Figure 5:
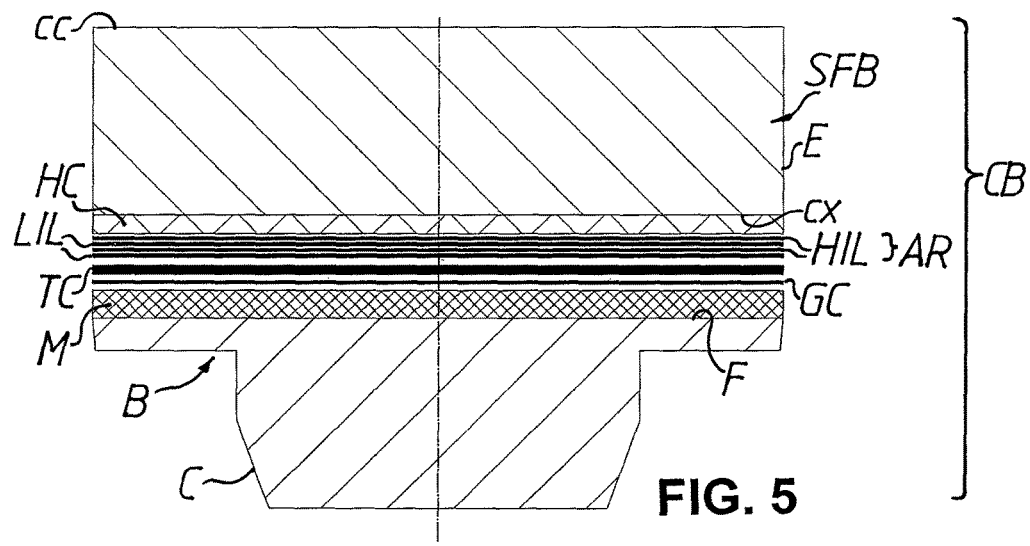
FIG. 5 shows a schematic sectional view of a combination of a block piece and of a spectacle lens blank blocked thereon in accordance with a preferred embodiment of the present invention, in between the main steps of blocking (FIG. 2) and processing (FIG. 4) on its second face cc the lens blank bonded to the block piece, with the temporary grip coating GC being directly interposed between the blocking material on the block piece and the top coating TC on the first face cx of the lens blank.
Figure 6:
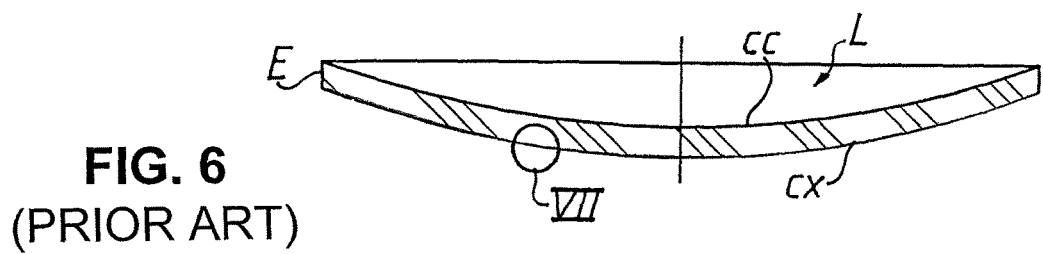
FIG. 6 shows a schematic sectional view of a known prior art spectacle lens.

Referring first to FIG. 5, a semi-finished lens blank SFB comprises a first face cx, a second face cc opposite said first face cx, and an edge E between the first face cx and the second face cc. The first face cx possesses a final curvature (not shown in the drawing) and is coated, starting from a substrate comprised of, e.g., mineral glass, polycarbonate, PMMA, CR 39, Trivex®, HI index, etc., as the case may be, with a standard hard coating HC, a standard antireflection coating AR on top of the hard coating HC, a standard top coating TC on top of the antireflection coating AR, and a special temporary grip coating GC on top of the top coating TC. As is known per se, the antireflection coating AR comprises a stack of alternating antireflection layers of high index HIL and low index LIL with an outermost, in FIG. 5 lowest layer, whereas the top coating TC is selected from a group comprising hydrophobic, oleophobic and dirt repelling coatings, as are known. According to an essential feature, the temporary grip coating GC and the outermost layer of the antireflection coating AR are comprised of one and the same coating material, preferably a metal oxide, in particular $SiO_2$. The thickness of the temporary grip coating GC may range from 1 to 500 nm, preferably from 5 to 100 nm, and more preferably from 15 to 25 nm.

Further, in FIG. 5 reference sign CB designates a combination of the above lens blank SFB and a block piece B for holding the lens blank SFB for processing thereof. As to the structure and function of a currently preferred block piece B explicit incorporation by reference is hereby made to U.S. Pat. No. 8,905,388 B2 of the present applicant. Such block piece B, which can also be used in thin film coating processes under vacuum conditions, typically has a basic body made from a plastic material, with a workpiece mounting face F for attachment of the lens blank SFB with the aid of a blocking material M on one side, and a clamping portion C on the other side which is grasped by a chuck or other suitable coupler during lens processing so as to fix the lens blank SFB blocked on the basic body of the block piece B in a machine or apparatus for processing of the lens blank SFB, and to provide in particular for reliable and secure mounting to the processing equipment throughout the whole process while avoiding damage and/or deformation to the lens blank SFB.

As far as a presently preferred blocking material M is concerned, which is applied directly onto the temporary grip coating GC of the lens blank SFB and preferably comprises an adhesive curable by UV or visible light that is liquid in an un-polymerized state, explicit corporation by reference is hereby made to U.S. Pat. No. 8,382,932 B2 of the present applicant. In order to enhance the bonding effect, the workpiece mounting face F of the block piece B may be plasma treated prior to applying the blocking material M onto the workpiece mounting face F, as will be explained later.

Method of Preparing a Lens Blank to be Ready for Blocking

Figure 1:
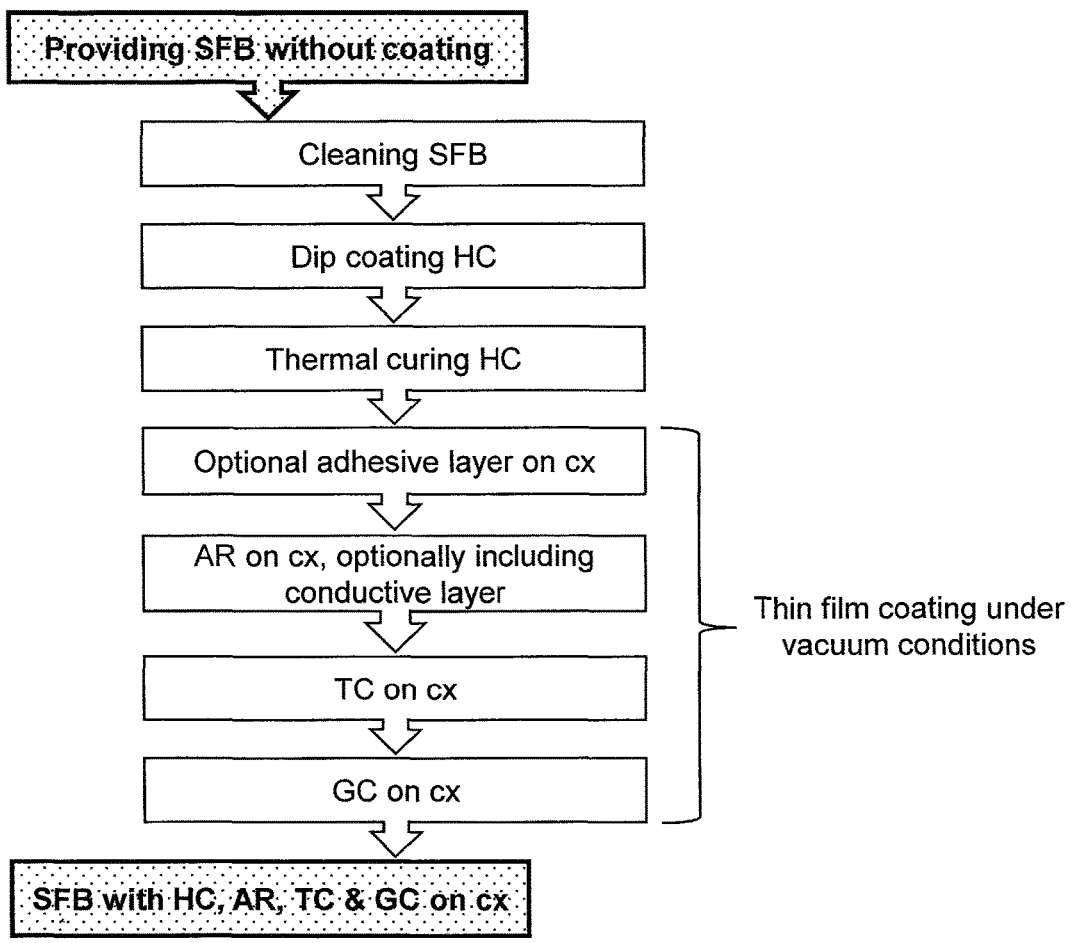
FIG. 1 is a flow chart illustrating the main process steps of a method for preparing a lens blank to be ready for blocking onto a block piece for a method for manufacturing spectacle lenses according to a prescription in accordance with a preferred embodiment of the present invention, basically encompassing full coating of a first, blocking face cx of the lens blank, including a temporary grip coating GC as an exposed outermost layer, prior to blocking.

Turning now to FIG. 1, the main process steps of a method for preparing the lens blank SFB to be ready for blocking onto the block piece B generally are as follows: First of all a lens blank SFB comprised of mineral glass or a suitable organic material, in particular one of the above mentioned plastic materials, is provided which has been casted or machined to give in particular the first face cx a defined, final curvature, but does not yet have a coating. The lens blank SFB is then cleaned as is usual in preparing for the coating steps.

After this the cleaned lens blank SFB, if comprised of an organic material, is dip coated with a conventional hard coating HC to provide the lens blank SFB with suitable anti-abrasion/anti-scratch properties. Usually, the dip coated HC layer is thermally cured to finally obtain a hard coating HC of 1,5 to 3 μm layer thickness, in particular on the first face cx of the lens blank SFB. Alternatively, a spin coating step or a vacuum coating step may take place to form the hard coating HC.

This step is followed by thin film coating steps which take place under vacuum conditions. As a first, optional thin film layer, a very thin adhesive layer may be coated onto the hard coating HC on the first face cx of the lens blank SFB to promote adhesion of the following antireflection coating AR to the hard coating HC. The antireflection coating AR applied then onto the first face cx of the lens blank SFB is a stack of alternating antireflection layers of high index HIL and low index LIL (cf. FIG. 5), optionally also including a conductive layer that serves to provide antistatic properties to the lens blank SFB. The total layer thickness of this antireflective layer stack typically ranges between 150 to 300 nm, depending on the desired optical properties.

After this, a rather thin top coating TC is applied, typically by evaporation, onto the first face cx of the lens blank SFB, which top coating TC is selected from standard hydrophobic, oleophobic and dirt repelling coatings and usually has a layer thickness lower than 20 nm.

Finally, a temporary grip coating GC from the same material as the last antireflective layer is applied on top of the top coating TC on the first face cx of the lens blank SFB. As mentioned before, the layer thickness of the temporary grip coating TC lies between 1 to 500 nm, preferably between 5 to 100 nm, and more preferably between 15 to 25 nm. As a result, the lens blank SFB comprises the complete functional coating system (HC, AR and TC) of the final spectacle lens on its first face cx, plus the temporary grip coating GC on top of all.

Examples of Preparing Lens Blanks to be Ready for Blocking

Several organic semi-finished spectacle lens blanks made from polycarbonate (Poly), Trivex® and Hi Index (n=1,67) were provided and cleaned with the aid of an ultrasonic cleaning bath. The lens blanks were then dip-coated to obtain an anti-abrasion anti-scratch coating of the known polysiloxane type followed by a thermal curing polymerization of the relevant monomers by heating the dip coated lens blanks in a drying cabinet for three hours at a temperature of 90 to 120° C. In this way a hard coating of approximately 2 to 3 μm layer thickness was produced on the first face cx of the lens blanks.

The lens blanks were subsequently placed into a vacuum box coater Satisloh 1200-DLF/DLX, provided with an electron beam gun underneath a Joule effect crucible as a Joule effect evaporation source. To be more precise the lens blanks were inserted into the carrousel of the vacuum box coater with their convex side cx facing the evaporation source. A high vacuum was then created by pumping the coater's vacuum treatment chamber, without heating the substrates. For the following vacuum coating steps the control of all coating thicknesses was performed using quartz scales (crystal monitors).

Then, seven optical layers were sequentially evaporated as a layer stack onto the first face cx of the lens blanks on top of the hard coating, with process parameters typical for a standard antireflection coating process. The optional first layer was an adhesive layer from a mixture of SiO and Cr in a ratio of approximately 40/60 weight %, commercially available as "Cermet" mixture from Umicore Thin Film Products AG. This very thin adhesive layer of approximately 1 nm layer thickness only was followed by a thicker layer of $SiO_2$ having a layer thickness of approximately 150 nm. The third layer consisted of $ZrO_2$ coated with a layer thickness of approximately 27 nm. The fourth layer was again formed from $SiO_2$ with a layer thickness of approximately 34 nm, followed by another layer of $ZrO_2$ having a layer thickness of approximately 44 nm. As the penultimate layer, one optional ITO (Indium Tin Oxide) conductive layer with a layer thickness of approximately 4 nm was applied to provide antistatic properties to the lens blanks. Finally, another layer of $SiO_2$ having a layer thickness of approximately 93 nm was evaporated. So the seven layers SiO/Cr, $SiO_2$, $ZrO_2$, $SiO_2$, $ZrO_2$, ITO, and $SiO_2$ formed the cx side antireflective layer stack on the lens blanks.

Thereafter, on top of the antireflective layer stack a hydrophobic and oil-repellent top coating was applied by evaporation of the product SATIN 1200 commercially available from the present applicant in pill form. To this end the SATIN 1200 pills were placed in the Joule effect crucible of the coater. The product evaporation took place under high vacuum. The coated TC layer thickness was approximately 13 nm.

Then coating of the temporary grip layer was performed by evaporation coating of again $SiO_2$ using the same vacuum coating equipment as described before. The grip layer coating step directly followed the application of the antireflective layer stack and the SATIN 1200 top coating on the first side cx of the lens blanks. The $SiO_2$ grip coating was evaporated with the electron beam gun of the coater in non-reactive mode (without oxygen), again with process parameters typical for a standard antireflection coating process. The physical thickness of the coated grip layer was approximately 20 nm.

After air ventilation of the vacuum treatment chamber of the coater the cx side coated, "grip prepared" lens blanks were unloaded from the coater for further processing.

Method of Blocking Grip Prepared Lens Blanks

Figure 2:
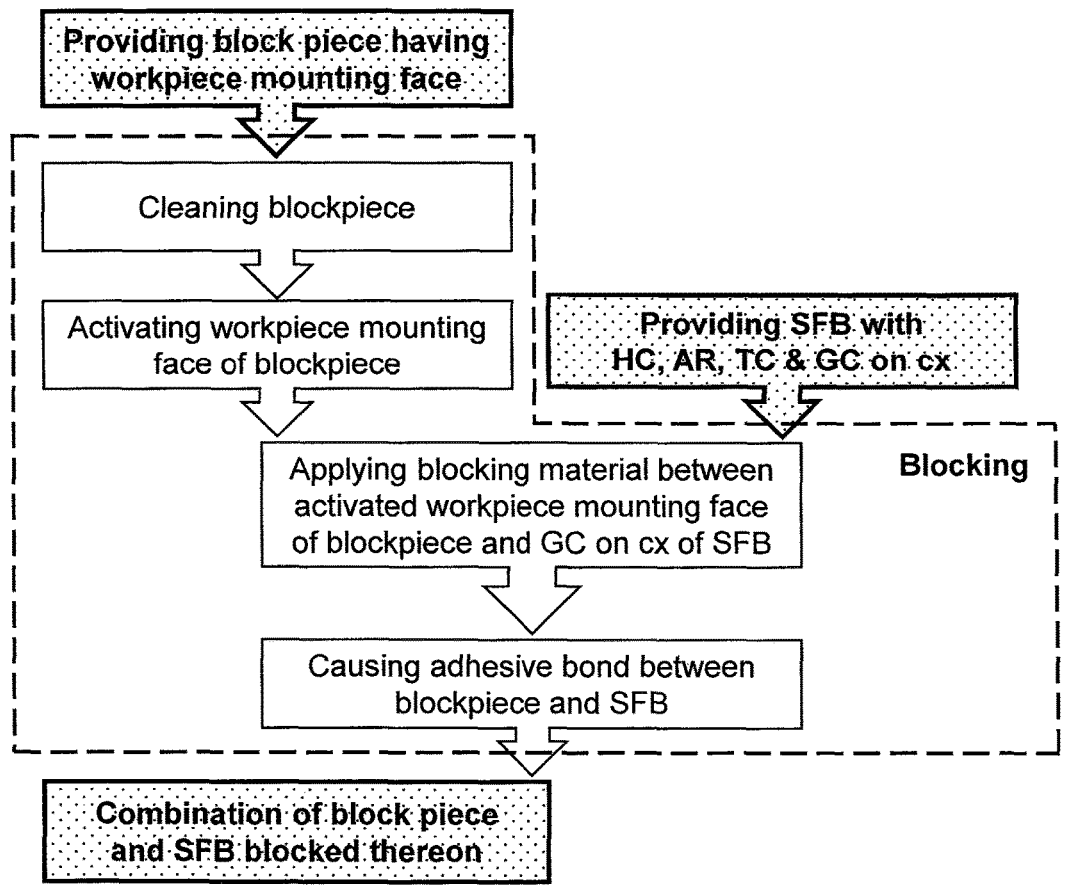
FIG. 2 is a flow chart illustrating the main process steps of a method of blocking the lens blank possessing the fully coated first face cx as a result of the method illustrated in FIG. 1, onto a block piece for holding the lens blank for processing thereof in a method for manufacturing spectacle lenses according to a prescription in accordance with a preferred embodiment of the present invention, in order to obtain a combination of the lens blank and the block piece which can be handled in one piece.

Turning now to FIG. 2, the main process steps of a method of blocking the above described cx side coated lens blank SFB onto the block piece B for holding the lens blank SFB for processing thereof generally are as follows: (a) providing the block piece B which, according to FIG. 5, comprises the basic body having the workpiece mounting face F on a first side and the clamping portion C on a second side, opposite said first side, including cleaning of the block piece B, if necessary; and (b) activating the workpiece mounting face F of the block piece B by plasma treating it.

At the same time or later: providing the lens blank SFB that has the complete functional coating system (HC, AR and TC) of the final spectacle lens on its first face cx, plus the temporary grip coating GC on top of it.

Then: (c) applying the blocking material M between the activated workpiece mounting face F of the block piece B and the first face cx of the lens blank SFB, with the blocking material M directly contacting both the plasma treated workpiece mounting face F of the block piece B and the temporary grip coating GC on the first face cx of the lens blank SFB; and (d) causing an adhesive bond between the lens blank SFB and the block piece B by applying a pressing force, curing and/or hardening the blocking material M depending on the nature thereof, to finally obtain the combination CB of the lens blank SFB and the block piece B which can be handled in one piece.

As indicated before, the currently preferred blocking material M comprises an adhesive curable by UV or visible light which is liquid in an un-polymerized state, as disclosed in U.S. Pat. No. 8,382,932 B2 of the present applicant. As to further method and apparatus details concerning the above essential blocking steps (c) and (d), explicit incorporation by reference is hereby made at this point to U.S. Pat. No. 8,616,150 B2 of the present applicant, to avoid related repetitions.

Further, preferably, the above step (c) of applying the blocking material M between the workpiece mounting face F of the block piece B and the first face cx of the lens blank SFB is carried out within two hours after the above step (b) of plasma treating the workpiece mounting face F of the block piece B, in order to reduce the risk that the plasma activated workpiece mounting face F saturates with oxygen and/or water.

Examples of Blocking Grip Prepared Lens Blanks

Several plastic material block pieces with different block piece curvatures were provided, as are commercially available for alloy free blocking with the so-called Nucleo™ system from the present applicant.

To improve the adhesion and long term stability thereof at the interface between block piece and blocking material, the reception surfaces (workpiece mounting faces) of the block pieces were manually cleaned by wiping with ethanol and then activated by plasma etching using an "Atto" low pressure plasma chamber made by Diener electronic GmbH+Co. KG, Ebhausen, Germany.

For the plasma treatment, the block pieces were placed in batches (approximately 20 block pieces per batch) into the plasma chamber. The plasma chamber settings were as follows: power 85% (approximately 85 W), air regulation on both needle valves with a flow rate of 40 standard liters per hour, pressure 0,4 mbar, period of plasma exposure about 4,5 minutes per batch. After plasma activation the block pieces were removed manually from the plasma chamber with the aid of gloves, with careful attention that the activated workpiece mounting faces of the block pieces were not touched.

In parallel, several grip prepared lens blanks were provided which had been treated as described before (cf. the above examples of preparing lens blanks to be ready for blocking).

Within less than two hours after plasma activation of the block pieces, the lens blanks were blocked onto the block pieces, using a standard Nucleo™ blocker of the present applicant, and with the aid of a UV curing adhesive composition commercially available under the trade name UV-307A from the present applicant.

Long Term Tests with Blocked, Grip Prepared Lens Blanks

Further tests have been conducted by the present inventors, as will be explained in the following. These tests have been carried out with a view to a currently preferred use of the present grip prepared lens blanks in a method for manufacturing spectacle lenses according to a prescription, in which blocking the lens blanks, with the aid of the blocking material, onto the block pieces takes place at a blocking time in a blocking place, whereas processing the blocked lens blanks to obtain the spectacle lenses according to the prescription takes place at a processing time in a processing place, with the blocking place being different from the processing place and/or there being a time lag of at least one day between the blocking time and the processing time (i.e., typically so-called "ship-on-block" methods). To be more precise, so as to ensure that blocked lens blanks can be shipped worldwide and stored in the inventory of a prescription laboratory for several months without losing the adhesion to their respective block piece, or deblocking therefrom during the surfacing or finishing treatments, long term endurance tests have been carried out to simulate thermal stress as follows:

Lens blanks made from three different materials, namely polycarbonate (Poly), Trivex® and High Index (n=1,67), and having three different front curves, namely 2, 5 and 8 diopter, were grip prepared as described above (see the examples of preparing lens blanks to be ready for blocking) and then blocked as described above (see the examples of blocking grip prepared lens blanks) onto block pieces with steeper and flatter curvature than the curvature of the respective lens blank. For the lens blanks with front (base) curve of 2 diopter, the radius of the block piece reception surface was 180 mm and 500 mm, respectively. For the lens blanks with front (base) curve of 5 diopter, the block pieces had a reception surface of 110 mm and 180 mm radius, respectively. The lens blanks with 8 diopter front (base) curve were blocked onto block pieces with a reception surface radius of 60 mm and 80 mm, respectively. This mismatch of curvatures was chosen to see if the resulting wedged layer of blocking adhesive would have a negative impact on the long term stability of the adhesion.

All in all three different durability tests were carried out in parallel during a total period of three months. For all three tests, as set forth in Tables 1, 2, and 3 as illustrated in FIGS. 8, 9 and 10, two to four identical combinations of lens blank and block piece types (same lens blank material, same front (base) curve and same block piece reception radius) were utilized to ensure a high validity of the test results.

Figure 3:
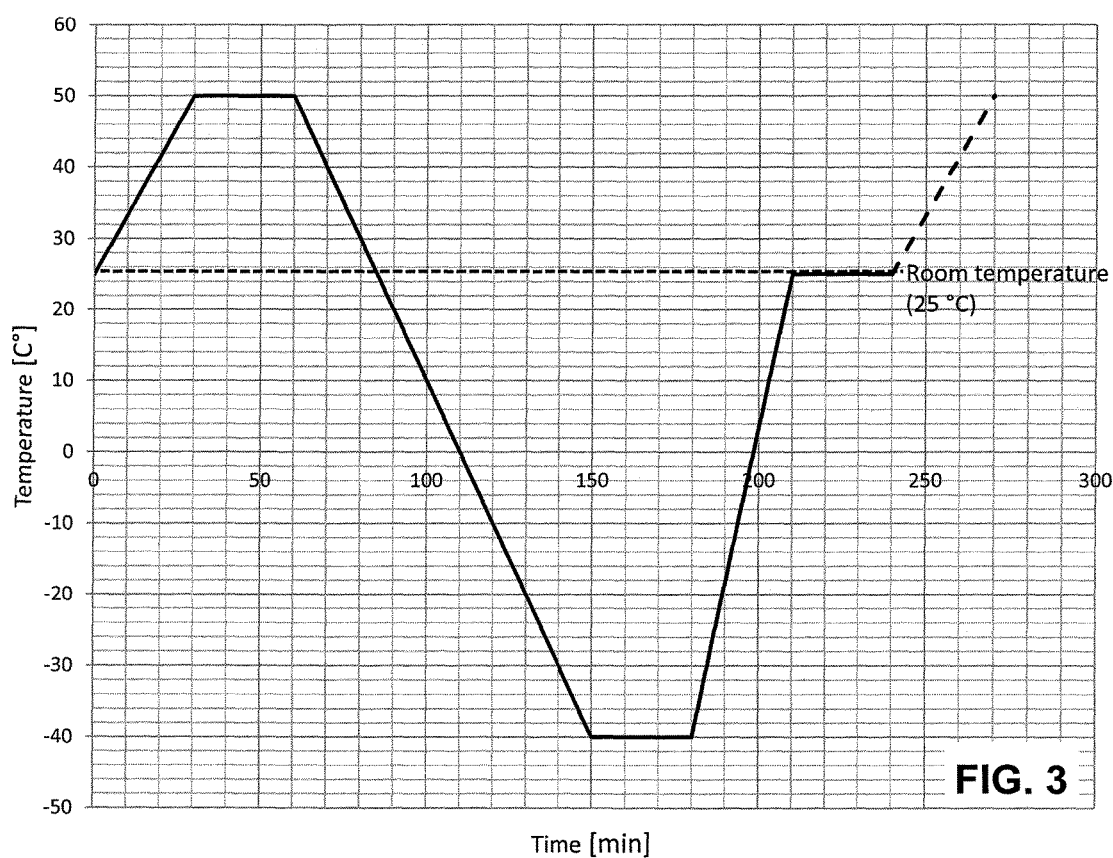
FIG. 3 is a diagram showing the temperature [° C.] as a function of time [min] in a long term temperature cycling test applied to lens blank and block piece combinations according to the invention obtained as a result of the method of blocking illustrated in FIG. 2, in order to examine the bonding stability and reliability of the lens blank and block piece combinations.

In the first durability test, see Table 1 (See FIG. 8), the blocked lens blanks were placed in a climate chamber to be subjected to a repetitive heating and cooling cycle as shown in FIG. 3. In each cycle, starting from room temperature (approximately +25° C.), the blocked lens blanks were heated up to a temperature of +50° C., held at +50° C. for approximately 30 minutes, subsequently cooled down to a temperature of −40° C., held at −40° C. for approximately 30 minutes, then heated up to room temperature again, and held at room temperature for at least 30 minutes before the next cycle started immediately or later, depending on the number of the respective cycle. One complete heating and cooling cycle lasted approximately four hours.

After each completion of six cycles, all blocked lens blanks were checked by visual inspection for signs of delamination which typically starts at the center of the contact zone. In case of delamination a zone with an air inclusion is visible when looking onto the blocked lens blank from above. Any air inclusion with a diameter larger than 15 mm can be considered to be critical because it might lead to an unintended deblocking of the lens blank from the block piece during the surfacing steps, as experiments conducted by the present inventors have shown.

In this first test, the heating and cooling cycle according to FIG. 3 was repeated 82 times during a period of 30 days, followed by a period of mere storage at a temperature of 23° C. for 60 days. The specific test results are shown in the attached Table 1 (See FIG. 8). Accordingly, no lens blank showed a delamination that can be considered to be critical for an unintended deblocking during surfacing or edging on block.

So as to simulate the thermal stress during shipment followed by a longer storage in an inventory of a prescription laboratory, a second endurance test was carried out at the same time. The blocked lens blanks were exposed to six temperature cycles as depicted in FIG. 3, followed by a storage at a temperature of approximately 23° C. for a period of 90 days. The results of this second test are shown in the attached Table 2 (See FIG. 9). Again, no lens blank showed a delamination that can be considered to be critical for an unintended deblocking during surfacing or edging on block.

Finally, a third endurance test was carried out in parallel to the two other tests. Here the blocked lens blanks were just stored for a period of 90 days at a temperature of approximately 23° C., without exposure to thermal stress (i.e. without using the climate chamber), and checked every seven days for delamination signs. The results of this third test are shown in the attached Table 3 (See FIG. 10). Accordingly, again, no critical delamination occurred.

Method for Manufacturing Spectacle Lenses from the Lens Blanks

Figure 4:
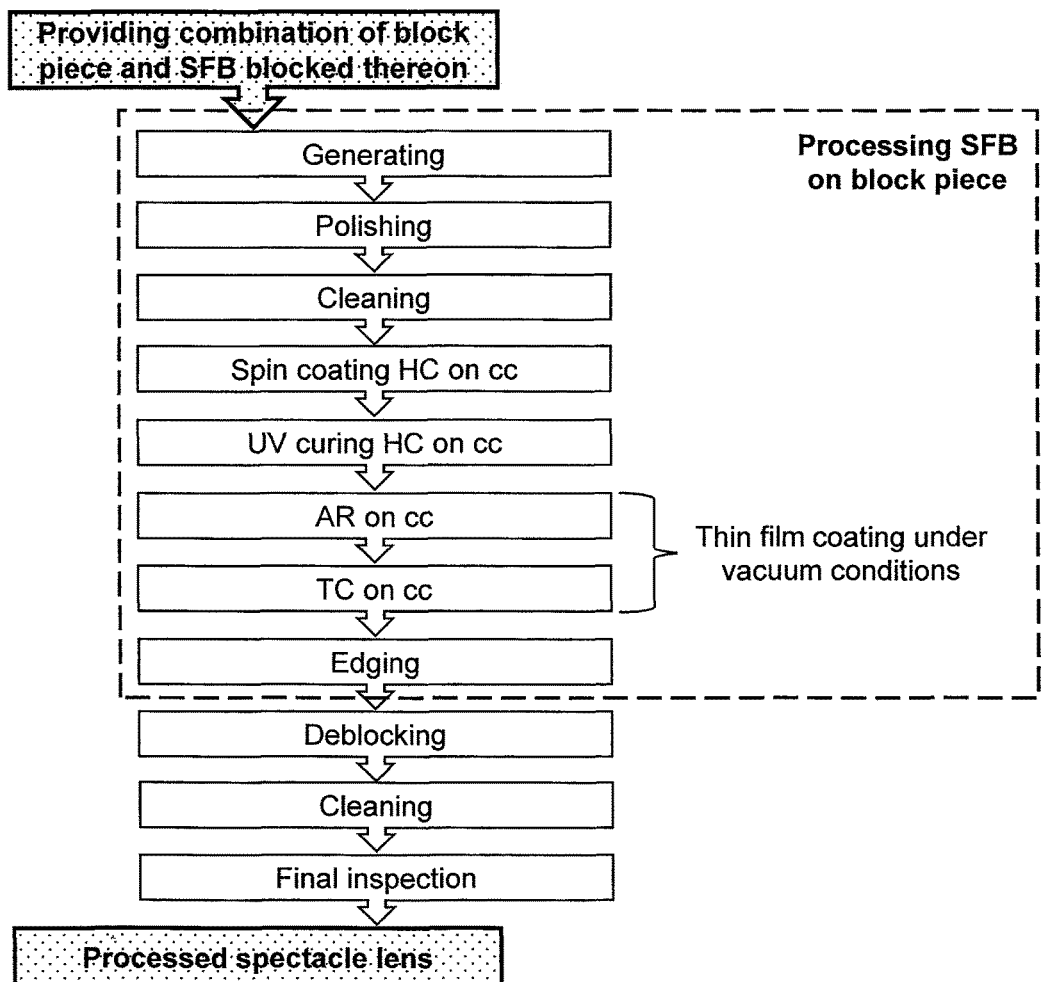
FIG. 4 is a flow chart illustrating the main process steps of a method for manufacturing spectacle lenses according to a prescription in accordance with a preferred embodiment of the present invention, using the lens blank and block piece combinations obtained as a result of the method of blocking illustrated in FIG. 2.

Referring now to FIG. 4, the main process steps of a method for manufacturing spectacle lenses according to a prescription from the blocked lens blanks SFB as described herein before generally are as follows: (i) providing the combination CB of the lens blank SFB and the block piece B as discussed above; (ii) processing the blocked lens blank SFB on the second face cc and optionally the edge E to obtain a processed lens, wherein this processing step also includes thin film coating under vacuum conditions on one and the same block piece B; and (iii) deblocking the processed lens from the block piece B.

To be more precise, the processing step (ii) includes the following substeps:

"Generating", i.e. machining of the blocked lens blank SFB to give the second face cc thereof a macrogeometry according to the prescription. Such surfacing is carried out using profiling machines which typically have a cutter of some type that is moved across the second face cc of the lens blank SFB in cutting engagement with the second face cc. The lens blank SFB may be stationary or rotating during the cutting operation, depending on the particular profiling machine which is being used. Typical machining processes for surfacing spectacle lenses L include single point diamond turning as the presently preferred fine cutting process for plastic materials and described in, e.g., U.S. Pat. No. 7,597,033 B2 or U.S. Pat. No. 7,975,356 B2 that shows the "VFT-orbit" generator of the present applicant diamond tool fly-cutting (cf., e.g., U.S. Pat. No. 7,373,706 B2), milling as the presently preferred rough cutting process for plastic materials and described in, e.g., U.S. Pat. No. 5,938,381 and grinding processes, applied depending on the lens material.

"Polishing", i.e. fine machining of the blocked lens blank SFB to give the second face cc the required microgeometry, as described, e.g., in U.S. Pat. No. 7,066,794 B2 and U.S. Pat. No. 7,278,908 B2. Depending on inter alia the material of the spectacle lenses L, the fine machining process is divided into a fine grinding operation and a subsequent polishing operation, or includes only a polishing operation if a polishable second face cc has already been produced during the generating stage. A suitable polishing machine is disclosed in U.S. Pat. No. 8,628,071 B2 that shows the "Duo-FLEX™" machine of the present applicant. The polishing step may even be dispensable if a "Cut & Coat" approach is being utilized, as disclosed in U.S. Pat. No. 8,153,193 B2 or U.S. Pat. No. 6,558,586 B1; alternatively, the blocked lens blank SFB may be laminated after machining with a foil to obtain a surface of optical quality.

Then, cleaning the blocked lens blank SFB that has been machined and fine machined, preferably including a manual cleaning step in a warm soap water bath using a sponge to remove residual polishing compound, followed by washing the blocked lens blank in clear water, wiping it with ethanol and drying it with compressed air.

After this, (optionally) spin (or dip) coating of the blocked lens blank SFB in order to provide the second face cc with a hard coating HC, or a primer, or a primer and a hard coating, and curing of the coating material, for example with the aid of UV radiation, depending on the nature of the coating material. A suitable piece of equipment for spin coating is described, e.g., in US Publication 2008/0035053 A1 that shows the "Magna-Spin" spin coating unit of the present applicant.

Figure 7:
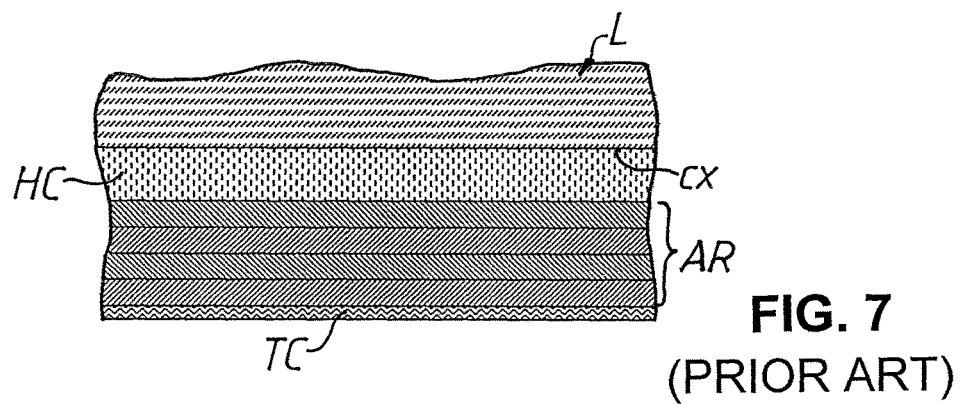
FIG. 7 is an enlarged view of detail VII in FIG. 6, illustrating a known prior art example for a coating that may be applied to the convex and/or concave face of the spectacle lens.

After this, vacuum coating of the blocked lens blank SFB to provide an antireflection coating AR normally consisting of four to seven layers made up of two to four materials with different refractive indices, as illustrated in FIG. 7 for the first face cx and (optionally) a top coating TC (cf. again FIG. 7) such as a hydrophobic and/or oleophobic and/or dirt repelling coating on the second face cc. In the vacuum coating step the blocked lens blank SFB is clamped to a substrate carrier of a rotary carrier device that is located in a vacuum chamber in a vertically spaced relation with respect to an evaporation source for emitting a vapor stream onto the second face cc of the lens blank SFB, as described, e.g., in U.S. Pat. No. 6,082,298. Sputtering technologies could also be used for forming the antireflection coating AR and (optionally) the top coating TC, in particular in cases where the coating steps shall be automated in small lot sizes. Alternatively, the antireflection layer AR may be obtained by laminating a foil having anti-scratch and antireflection properties onto the second face cc of the lens blank SFB.

Finally, (and optionally) edging of the blocked lens blank SFB to give the edge E the geometry required for insertion into a spectacle frame or a spectacle holder. The edging step may also include the forming of bores, grooves, channels and/or bevels corresponding to the respective mounting requirements in the edge area of the spectacle lens L, as described, e.g., in U.S. Pat. No. 6,712,671 B2.

Since the single processing substeps as well as the equipment and consumables used in those are well known to the person skilled in the art, further explanations in this respect appear to be not necessary at this point. Nevertheless, as to possible materials for and the structure of the multilayer coating system on the second face cc of the spectacle lens L (including hard coating HC, antireflection coating AR and top coating TC) as well as the application of such coatings, explicit incorporation by reference is hereby made to the brochure "An Introduction To The Coating Of Ophthalmic Lenses", 2nd Edition 2006, published by the present applicant. In particular, the multilayer coating system may be that available from the present applicant under the trade marks "U900" for a spin coatable, UV polymerizing hard coating HC lacquer, "Ioncote K+" for a vacuum coatable antireflection coating AR, and "Satin" for a vacuum coatable super hydrophobic and oleophobic top coating TC.

After the above processing substeps, deblocking of the processed lens L from the block piece B takes place. Preferably, the deblocking step (iii) is carried out using a high-pressure jet of pressure medium which is directed onto an edge region between the processed lens L and the block piece B in order to separate the processed lens L from the block piece B. Suitable automated and manual deblocking devices that utilize a high-pressure jet of water as the pressure medium, are described in U.S. Pat. No. 8,931,769 B2 and U.S. Publication 2013/061462 A1 of the present applicant. As to structure and function of such deblockers, explicit incorporation by reference is hereby made to the above-mentioned documents.

Experiments conducted by the present inventors have shown that, by using such water-based high-pressure deblocking process, the temporary grip coating GC is almost completely removed from the cx face top coating TC of the processed lens L, together with the blocking material M and of course the block piece B, without degrading the hydrophobic, oleophobic and/or dirt repelling properties of the cx face top coating TC to an extent worth mentioning. Minor residues of the temporary grip coating GC, if any, can be removed in the subsequent cleaning step by manual wiping with a clean cloth and isopropyl alcohol and/or in combination with a washing step using an aqueous solution having a pH-value substantially equal to 7.

At the very end of the method for manufacturing spectacle lenses, the processed lens L is finally inspected as to whether it is intact and with respect to its (edge) geometry and optical characteristics.

In the tests conducted by the present inventors, the temporary grip coating worked very well in all the processing steps, i.e. the blocked lens blanks did not unintentionally come off their respective block pieces under the outer influences (process forces, temperature, etc.). Moreover, the resulting lenses, after deblocking and cleaning, showed excellent optical features as well as outstanding hydrophobic and oil-repellent properties.

In order to check the function of the hydrophobic and oil-repellent top coating on the first (former) blocking face of the finished lenses, the contact angle was measured using a drop shape analyzer type "DSA 10", manufactured by Krüss GmbH, Hamburg, Germany. For measuring the contact angle with this instrument, a droplet of demineralized water was applied to the respective coated lens surface using a syringe and a micrometer to dose the size of the droplet. A video camera took a lateral picture of this droplet while it was illuminated from the back side. By using this picture the tangential angle (contact angle) was measured at the boundary between the lens surface and the bottom radius of the droplet surface. The average of three measurements was used as final result. These measurements were carried out before the hydrophobic, i.e. top coated lens blank was grip coated and blocked and again after the lens had been finished, deblocked and cleaned. The contact angle in each case was no less than 2° smaller after the treatment of the lenses, as compared to the initial contact angle.

A lens blank is proposed, having a first face, an opposite, second face, and an edge inbetween, the first face possessing a final curvature and being coated, in this order, with an antireflection coating, a top coating, and a temporary grip coating. The antireflection coating comprises a stack of alternating antireflection layers with an outermost layer, whereas the top coating is selected from a group comprising hydrophobic, oleophobic and dirt repelling coatings. The temporary grip coating and the outermost layer of the antireflection coating are comprised of one and the same coating material. In this way the temporary grip coating effectively serves to provide sufficient adhesion to the blocking material on the block piece in the processing steps, and can easily be removed from the processed lens upon deblocking without degrading the repelling properties of the top coating.

Variations and modifications are possible without departing from the scope and spirit of the present invention as defined by the appended claims.

The invention claimed is:

1. A lens blank comprising a first face, a second face opposite said first face, and an edge between said first face and said second face, said first face possessing a final curvature and being coated at least with an antireflection coating, a top coating on top of said antireflection coating, and a temporary grip coating on top of said top coating, wherein said antireflection coating comprises a stack of alternating antireflection layers of high index and low index with an outermost layer, and wherein the top coating is selected from a group comprising hydrophobic, oleophobic and dirt repelling coatings, characterized in that said temporary grip coating and said outermost layer of said antireflection coating are comprised of one and the same coating material.

2. The lens blank according to claim 1, characterized in that said temporary grip coating and said outermost layer of said antireflection coating are comprised of a metal oxide.

3. The lens blank according to claim 2, characterized in that said metal oxide is $SiO_2$.

4. The lens blank according to claim 3, characterized in that said temporary grip coating has a thickness ranging from 1 to 500 nm, preferably from 5 to 100 nm, and more preferably from 15 to 25 nm.

5. A combination of the lens blank according to claim 4 and a block piece for holding the lens blank for processing thereof, characterized in that
said block piece comprises a basic body with a workpiece mounting face against which said lens blank is blocked by use of a blocking material, and a clamping portion via which said lens blank blocked on said basic body can be fixed in a machine or apparatus for processing of said lens blank, wherein said blocking material is applied directly onto said temporary grip coating of said lens blank.

6. The combination according to claim 5, characterized in that said blocking material comprises an adhesive curable by UV or visible light that is liquid in an un-polymerized state.

7. The combination according to claim 5, characterized in that said basic body of said block piece consists of a plastic material.

8. The combination according to claim 5, characterized in that said workpiece mounting face of said block piece is plasma treated prior to applying said blocking material onto said workpiece mounting face.

9. A combination of the lens blank according to claim 1 and a block piece for holding the lens blank for processing thereof, characterized in that said block piece comprises a basic body with a workpiece mounting face against which said lens blank is blocked by use of a blocking material, and a clamping portion via which said lens blank blocked on said basic body can be fixed in a machine or apparatus for processing of said lens blank, wherein said blocking material is applied directly onto said temporary grip coating of said lens blank.

10. The combination according to claim 9, characterized in that said blocking material comprises an adhesive curable by UV or visible light that is liquid in an un-polymerized state.

11. The combination according to claim 10, characterized in that said basic body of said block piece consists of a plastic material.

12. The combination according to claim 9, characterized in that said basic body of said block piece consists of a plastic material.

13. The combination according to claim 9, characterized in that said workpiece mounting face of said block piece is plasma treated prior to applying said blocking material onto said workpiece mounting face.

14. A method of blocking the lens blank according to claim 1 onto a block piece for holding the lens blank for processing thereof, characterized by the steps of:
(a) providing said block piece which comprises a basic body with a workpiece mounting face on a first side and a clamping portion on a second side, opposite said first side;
(b) plasma treating said workpiece mounting face of said block piece;
(c) applying a blocking material between said workpiece mounting face of said block piece and said first face of said lens blank, with said blocking material directly contacting both said plasma treated workpiece mounting face of said block piece and said temporary grip coating on said first face of said lens blank; and
(d) causing an adhesive bond between said lens blank and said block piece by applying a pressing force, curing and/or hardening said blocking material depending on the nature thereof, to obtain a combination of said lens blank and said block piece which can be handled in one piece.

15. The method according to claim 14, characterized in that said step (c) of applying said blocking material between said workpiece mounting face of said block piece and said first face of said lens blank is carried out within 2 hours after said step (b) of plasma treating said workpiece mounting face of said block piece.

16. Use of the lens blank according to claim 1 in a method for manufacturing spectacle lenses according to a prescription, characterized in that blocking said lens blank, with the aid of a blocking material, onto a block piece for holding said lens blank for processing thereof takes place at a blocking time in a blocking place, whereas processing said blocked lens blank to obtain the spectacle lens according to the prescription takes place at a processing time in a processing place, wherein said blocking place is different from said processing place and/or there is a time lag of at least one day between said blocking time and said processing time.

17. A method for manufacturing spectacle lenses according to a prescription, characterized by the steps of:
 (i) providing the combination of the lens blank and the block piece according to one of the claims 5 to 8;
 (ii) processing said blocked lens blank on said second face and optionally said edge to obtain a processed lens, wherein said processing step (ii) may also include thin film coating under vacuum conditions on one and the same block piece; and
 (iii) deblocking said processed lens from said block piece.

18. The method according to claim 17, characterized in that said processing step (ii) comprises the following sub-steps:
 machining of said blocked lens blank to give said second face a macrogeometry according to the prescription;
 fine machining of said blocked lens blank to give said second face a required microgeometry;
 cleaning said blocked lens blank that has been machined and fine machined;
 optionally spin or dip coating of said blocked lens blank in order to provide said second face with a hard coating, or a primer, or a primer and a hard coating;
 vacuum coating of said blocked lens blank to provide an antireflection coating and optionally a top coating such as hydrophobic and/or oleophobic and/or dirt repelling coating on said second face; and
 optionally edging of said blocked lens blank to give said edge a required geometry so that said processed lens is ready for insertion into a spectacle frame or a spectacle holder.

19. The method according to claim 18, characterized in that said deblocking step (iii) is carried out using a high-pressure jet of pressure medium which is directed onto an edge region between said processed lens and said block piece in order to separate said processed lens from said block piece.

20. The method according to claim 17, characterized in that said deblocking step (iii) is carried out using a high-pressure jet of pressure medium which is directed onto an edge region between said processed lens and said block piece in order to separate said processed lens from said block piece.

* * * * *